(12) United States Patent
Andrade et al.

(10) Patent No.: US 7,627,002 B1
(45) Date of Patent: Dec. 1, 2009

(54) MECHANISM FOR DEPLOYING AN ACCESS POINT WITHIN A WLAN USING A SINGLE INTERCONNECT

(75) Inventors: Merwyn B. Andrade, San Jose, CA (US); Kent H. Headrick, Milpitas, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1007 days.

(21) Appl. No.: 10/237,755

(22) Filed: Sep. 9, 2002

(51) Int. Cl.
*H04H 20/28* (2008.01)

(52) U.S. Cl. .................. 370/487; 370/338; 455/90.3; 340/333

(58) Field of Classification Search ............... 370/228, 370/328, 463, 338, 487, 466; 455/90.3, 561; 340/333, 425.2
See application file for complete search history.

(56) References Cited

U.S. PATENT DOCUMENTS

| | | | | | |
|---|---|---|---|---|---|
| 5,457,629 | A | * | 10/1995 | Miller et al. ................. | 701/1 |
| 5,960,344 | A | * | 9/1999 | Mahany ................... | 455/432.2 |
| 6,140,911 | A | * | 10/2000 | Fisher et al. ................ | 375/258 |
| 6,396,137 | B1 | * | 5/2002 | Klughart ..................... | 257/691 |
| 6,978,319 | B1 | * | 12/2005 | Rostoker et al. ............ | 709/250 |
| 7,113,978 | B2 | * | 9/2006 | Beasley et al. ............. | 709/208 |
| 7,177,661 | B2 | * | 2/2007 | Shpak ........................ | 455/524 |
| 2002/0069300 | A1 | * | 6/2002 | Pascolini .................... | 709/250 |

OTHER PUBLICATIONS

Application Note 723 by Maxim Dec. 29, 2000.*

IEEE Standards, IEEE Std 802.3 (Revision of IEEE Std 802.3 2000 Edition), Standard for Information Technology-Telecommunications and Information exchange between systems- Local and metropolitan area networks- Specific Requirements Part 3: Carrier sense multiple access with collision detection (CSMA/CD) access method and physical layer specifications, Mar. 8, 2002, pp. 1-1, 538, The Institute of Electrical and Electronics Engineers, Inc., New York USA. Part one of four.

IEEE Standards, IEEE Std 802.3 (Revision of IEEE Std 802.3 2000 Edition), Standard for Information Technology-Telecommunications and Information exchange between systems- Local and metropolitan area networks- Specific Requirements Part 3: Carrier sense multiple access with collision detection (CSMA/CD) access method and physical layer specifications, Mar. 8, 2002, pp. 1-1, 538, The Institute of Electrical and Electronics Engineers, Inc., New York USA. Part two of four.

IEEE Standards, IEEE Std 802.3 (Revision of IEEE Std 802.3 2000 Edition), Standard for Information Technology-Telecommunications and Information exchange between systems- Local and metropolitan area networks- Specific Requirements Part 3: Carrier sense multiple access with collision detection (CSMA/CD) access method and physical layer specifications, Mar. 8, 2002, pp. 1-1, 538, The Institute of Electrical and Electronics Engineers, Inc., New York USA. Part three of four.

(Continued)

*Primary Examiner*—Jason E Mattis
*Assistant Examiner*—Dady Chery
(74) *Attorney, Agent, or Firm*—Blakely, Sokoloff, Taylor & Zafman LLP

(57) ABSTRACT

In one embodiment, the invention relates to utilization of a single interconnect to support the transmission of data, power and serial control information to an access point. The interconnect comprises at least three and perhaps four twisted pairs such as a CAT-5 cable.

17 Claims, 6 Drawing Sheets

OTHER PUBLICATIONS

IEEE Standards, IEEE Std 802.3 (Revision of IEEE Std 802.3 2000 Edition), Standard for Information Technology-Telecommunications and Information exchange between systems- Local and metropolitan area networks- Specific Requirements Part 3: Carrier sense multiple access with collision detection (CSMA/CD) access method and physical layer specifications, Mar. 8, 2002, pp. 1-1, 538, The Institute of Electrical and Electronics Engineers, Inc., New York USA. Part four or four.

IEEE Standards, IEEE Std 802.3ae (Amendment to IEEE Std 802.3 2002), IEEE Standard for Information Technology-Telecommunications and Information exchange between systems- Local and metropolitan area networks- Specific Requirements Part 3: Carrier sense multiple access with collision detection (CSMA/CD) access method and physical layer specifications, Amendment: Media Acess Control (MAC) Parameters, Physical Layers, and Management Parameters for 10 Gb/s Operation, Aug. 30, 2002, pp. 1-529, The Institute of Electrical and Electronics Engineers.

* cited by examiner

US 7,627,002 B1

MECHANISM FOR DEPLOYING AN ACCESS POINT WITHIN A WLAN USING A SINGLE INTERCONNECT

FIELD

Embodiments of the invention relate to the field of wireless communications, in particular, to a mechanism for communicatively coupling an Access Point to a wireless local area network (WLAN) over a single interconnect.

GENERAL BACKGROUND

Over the last decade, for most businesses, it has become a necessity for employees to share data over local area networks. To improve efficiency, enhancements have added to local area networks such as remote wireless access. This enhancement provides an important extension by enabling the formation of a wireless local area network (WLAN).

Typically, a WLAN features an Access Point (AP). The AP operates as a relay device to receive data frames and transmit data from these frames to a fixed, wired network. Thus, an AP supports communications with both a wireless network and a wired network.

Typically, as shown in FIG. 1, a conventional AP 100 is deployed within and communicatively coupled to a WLAN through four interfaces: (1) a radio frequency (RF) interface 120, (2) an IEEE 802.3 (Ethernet) interface 140, (3) a RS-232 interface 160 and (4) a power interface 180.

The RF interface 120 is a combination of an antenna and RF transceiver circuitry to enable AP 100 to communicate with one or more wireless stations 105.

IEEE 802.3 interface 140 is adapted to transfer Ethernet frames from/to AP 100 to/from resources coupled to a wired network 110, which are also supported by AP 100. Such communications are achieved via an Ethernet switch 155. Interface 140 includes a connector adapted to receive a CAT-5 twisted pair cable 150. CAT-5 twisted pair cable 150 features one twisted pair for data transmission (TX) and the other for data reception (RX).

Power interface 160 is adapted for AP 100 to receive power, normally supplied through a low voltage DC jack 165 that is attached to a small AC power converter (wall wart) 170. However, in accordance with IEEE 802.3af entitled "Data Terminal Equipment (DTE) Power Via Media Dependent Interface" (IEEE 802.3af, 2001), power may be provided over CAT-cable 150 either on twisted pairs carrying Ethernet data or by another twisted pair that is part of the standard CAT-5 cable. According to this specification, forty-eight (48) volts direct current (DC) is used as the power source.

Serial interface 180 is used for controlling the initial configuration of AP 100 as well as for troubleshooting functional problems with AP 100. Typically, a terminal server 190 is attached to serial interface 180 over a RS-232 cable 185, which allows resources attached to wired network 110 to communicate with serial devices in communication with terminal server 190.

One problem associated with conventional APs is that their installation is cumbersome and requires a qualified electrician to run alternating current (AC) power wiring to support the AP. Also, since two sets of cables for Ethernet data (CAT-5 cable) and serial control (RS-232 cable) need to be run during installation, installation costs are substantially increased for extra materials and labor. Also, additional costs are needed for the purchase, installation and management of a terminal server to enable control and management of the AP.

BRIEF DESCRIPTION OF THE DRAWINGS

The invention may best be understood by referring to the following description and accompanying drawings that are used to illustrate embodiments of the invention.

DETAILED DESCRIPTION

Herein, certain embodiments of the invention relate to a mechanism for interconnecting a wireless local area network (WLAN) device such as a Radio Access Point (AP) using a single interconnect. The WLAN may be configured in accordance with Institute of Electrical and Electronics Engineers (IEEE) 802.11 standard entitled "Wireless LAN Medium Access Control (MAC) and Physical Layer (PHY) Specifications" (IEEE 802.11, 1999), different types of High Performance Radio Local Area Networks (HiperLAN) or subsequently published specifications.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, a "component" may include hardware and/or software that has certain functionality. "Software" features executable code such as an operating system, an application, an applet, or even a routine. The software as well as data and other signaling may be stored in any appropriate storage medium such as a programmable electronic circuit, a semiconductor memory device, a volatile memory (e.g., random access memory, etc.), a non-volatile memory (e.g., read-only memory, flash memory, etc.), a floppy diskette, an optical disk such as a compact disk (CD) or digital versatile disc (DVD), a hard drive disk, or any type of interconnect (defined below).

An "interconnect" is generally defined as an information-carrying medium that establishes a communication pathway. Examples of such information-carrying medium include a physical medium such as one or more electrical wires, optical fibers, cables, bus traces, or similar materials. One type of cable is CAT-5, which features four twisted pairs optionally housed in a protective sheath.

Figure 1:
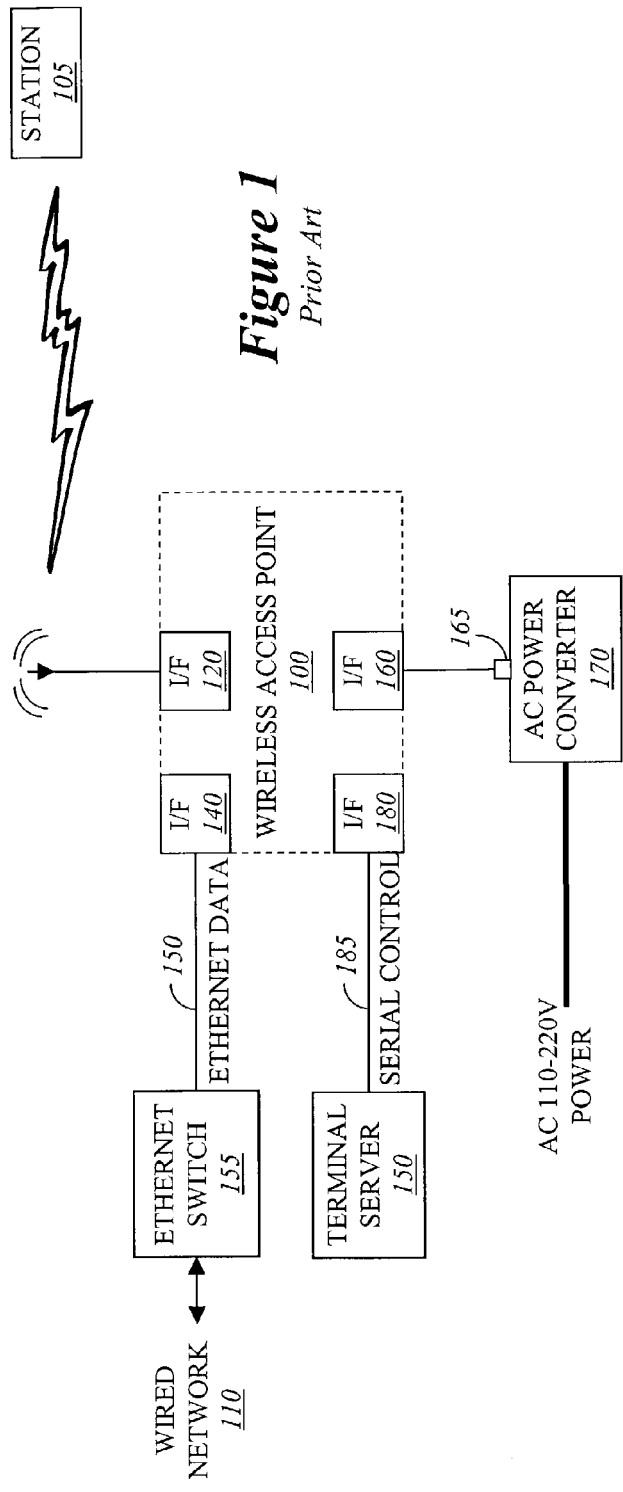
FIG. 1 illustrates typical connectivity of an Access Point of a wireless local area network.
Figure 2:
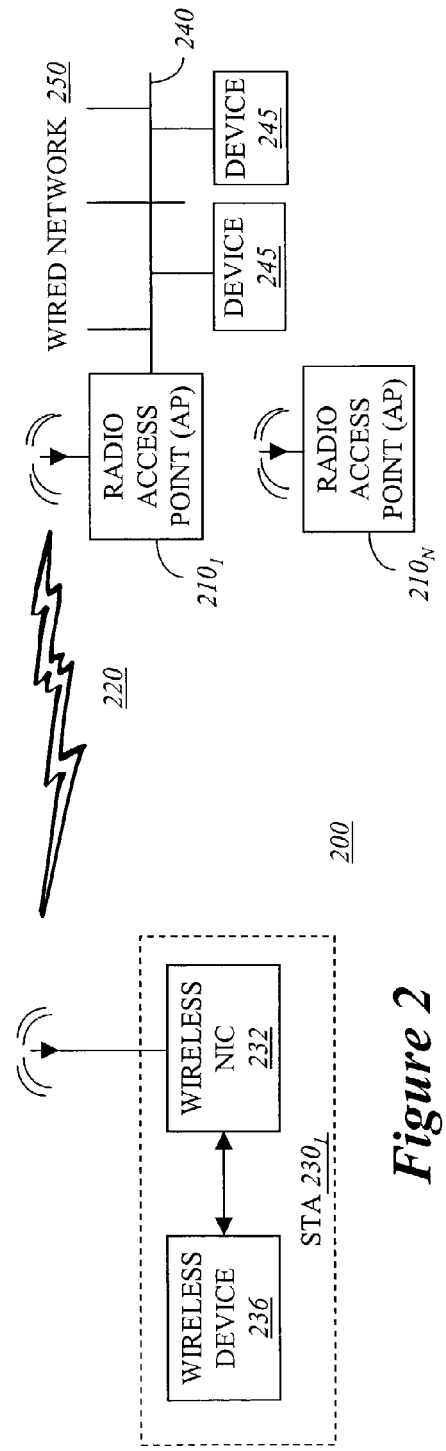
FIG. 2 is an exemplary embodiment of a wireless local area network.

Referring to FIG. 2, an exemplary embodiment of a wireless local area network (WLAN) 200 in accordance with the invention is illustrated. WLAN 200 comprises one or more (N) Radio Access Points (AP) $210_1$-$210_N$ that communicate over air 220 with one or more (M) wireless stations (STAs)

$230_1$-$230_M$. For illustrative purposes, only one AP $210_1$ and one STA $230_1$ are shown in detail, although multiple versions of each can be deployed.

AP $210_1$ is further coupled to a physical medium 240 that forms part of a wired network 250. The wired network 250 features resources that are available for users of the network 100. Such resources may include devices 245 for data storage coupled to physical medium 240.

In general, AP $210_1$ is an electronic device that provides bi-directional communications between one or more STAs $230_1$-$230_M$ and a network such as wired network 250. AP $210_1$ is communicatively coupled to wired network 250 via a medium, which may be a physical medium (as shown) or a wireless medium. Wired network 250 can be of any type of wired network, including but not limited or restricted to Ethernet, Token Ring, Asynchronous Transfer Mode (ATM) or the like.

STA $230_1$ includes a removable, wireless network interconnect card (NIC) 232 that is separate from or employed within a wireless device 236 that processes information (e.g., computer, personal digital assistant "PDA", telephone, alphanumeric pager, etc.). Normally, NIC 232 comprises a wireless transceiver, although it is contemplated that NIC 232 may feature only receive (RX) or transmit (TX) functionality such that only a receiver or transmitter is implemented.

STA $230_1$ communicates with and accesses information from AP $210_1$ over the air 220 in accordance with IEEE 802.11 communications protocol or another WLAN protocol. Hence, AP $210_1$ generally operates as a transparent bridge connecting both a wireless network featuring STA $230_1$ with wired network 250.

Figure 3:
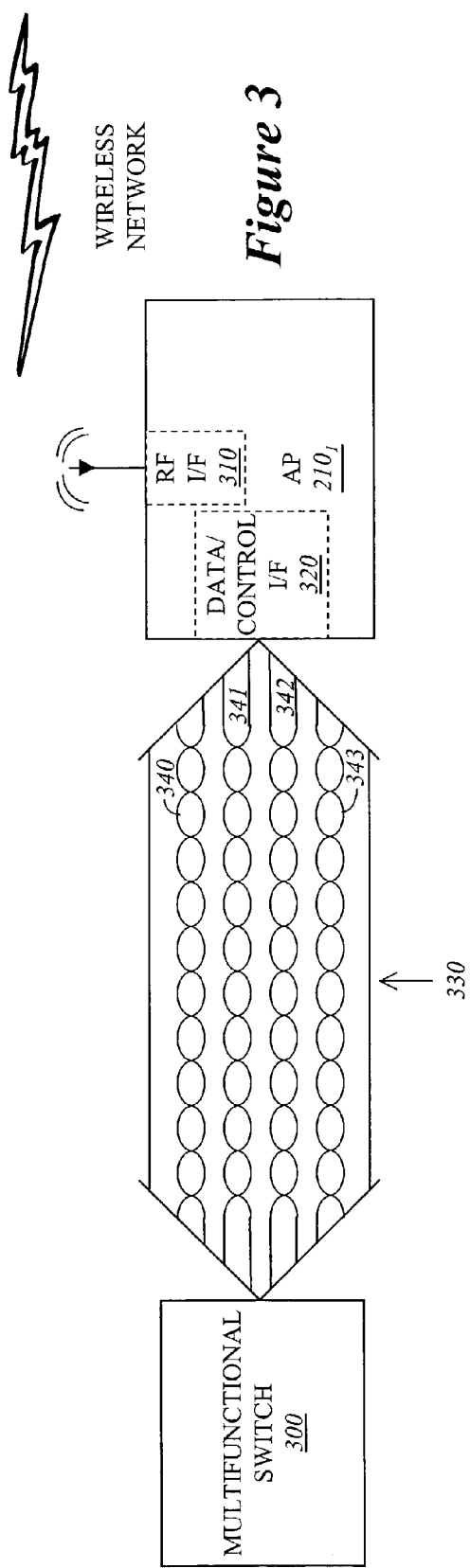
FIG. 3 is a first exemplary embodiment of single interconnect connectivity of an Access Point of FIG. 2.

Referring now to FIG. 3, a first exemplary embodiment of single interconnect connectivity of AP $210_1$ of FIG. 2 is shown. Attached to a multifunctional switch 300, AP $210_1$ comprises (1) a radio frequency interface (RF I/F) 310 and data/control interface 320.

RF interface 310 comprises an antenna and RF transceiver circuitry (operating in combination to transmit signals to one or more STAs $230_1$-$230_M$. RF transceiver circuitry may include modulation and/or demodulation as well as encoding and/or decoding functionality.

Data/Control interface 320 comprises one or more communication ports adapted to receive and/or transmit data from switch 300 over an interconnect 330. For one embodiment of the invention, interconnect 330 is a CAT-5 twisted pair cable, which features four twisted pairs 340-343. Herein, one twisted pair 340 is used to transmit data while another pair 341 is used to receive data. The data may be in accordance with any communication protocol such as Ethernet for example as describe herein for illustrative purposes. These pairs 340 and 341 also provide power to AP $210_1$ in accordance with IEEE 802.3af. The remaining twisted pairs 342 and 343 are adapted as serial communication lines in accordance with RS-232, RS-422A, RS-485 or any other serial communication protocol.

Figure 4:
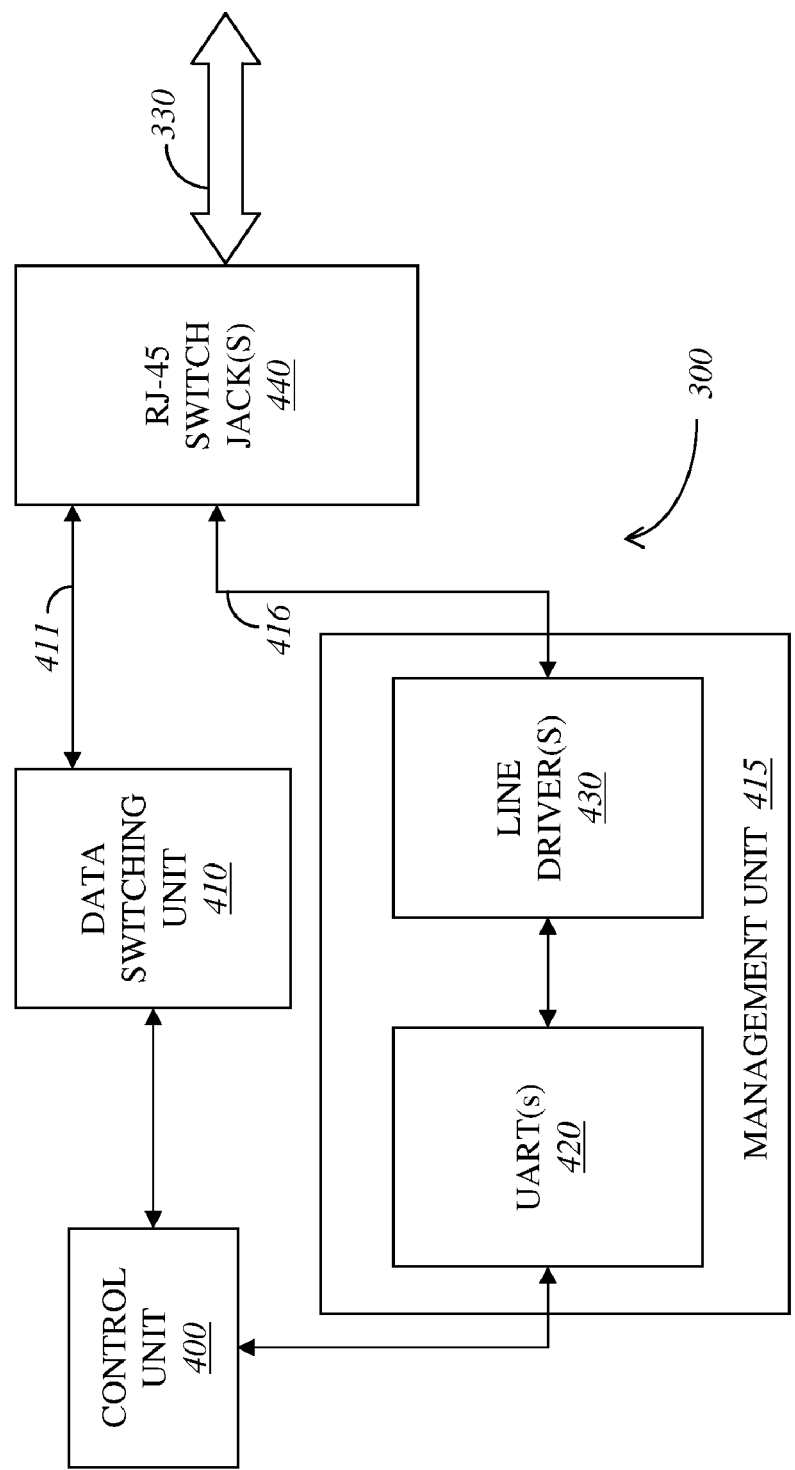
FIG. 4 is an exemplary embodiment of a multifunctional switch coupling the Access Point of FIG. 2 with the wired network.

Referring now to FIG. 4, an exemplary embodiment of a multifunctional switch 300 coupling the Access Point $210_1$ of FIG. 2 with the wired network 250 is shown. In order to eliminate the need for a separate terminal server, switch 300 has been reconfigured to include switching and control functions, serial port interfaces and signal converters.

More specifically, switch 300 comprises a plurality of components, including but not limited to a control unit 400, a data switching unit 410 and a management unit 415 including at least one universal asynchronous receive transmit (UART) component 420 and at least one line driver component 430. Both data switching unit 410 and management unit 415 are coupled to at least one switch jack 440 via interconnects 411 and 416 (as shown). Alternatively, interconnects 411 and 416 from data switching unit 410 and management unit 415 are hardwired to interconnect 330.

Upon receiving incoming information, control unit 400 processes such information and subsequently routes the processed information to data switching unit 410 or management unit 415. In the event that the information is data being transmitted or protocol control information, both control unit 400 and data switching unit 410 place the data into frames (e.g., an Ethernet frames) and provides these frames to switch jack 440 for this embodiment. Switch jack 440 includes at least eight (8) electrical connections such as an 8-pin RJ-45 switch jack. Where switch 300 is coupled to multiple switch jacks, data switching unit 410 is further responsible for determining routing to such switch jacks.

In the event that the information is control associated with out-of-band functionality (e.g., TELNET usage for serial emulation in obtaining AP status information), such information is processed by control unit 400 and routed to one or more UART(s) 420 of management unit 415. UART(s) 420 converts parallel data from control unit 400 into serial data that is capable of being transmitted using an RS-232 serial protocol for this embodiment of the invention. It is contemplated, however, that other serial protocols such as RS-422A or RS-485 may be supported. The serial data is routed to line driver(s) 430, which convert the serial data signals from UART(s) 420 into specific voltages in accordance with the RS-232 specification. The number of UART(s) 420 and line driver(s) 430 is equivalent to the number of switch jack(s) 440. Of course, it is contemplated that UART functionality can be emulated by software.

Figure 5:
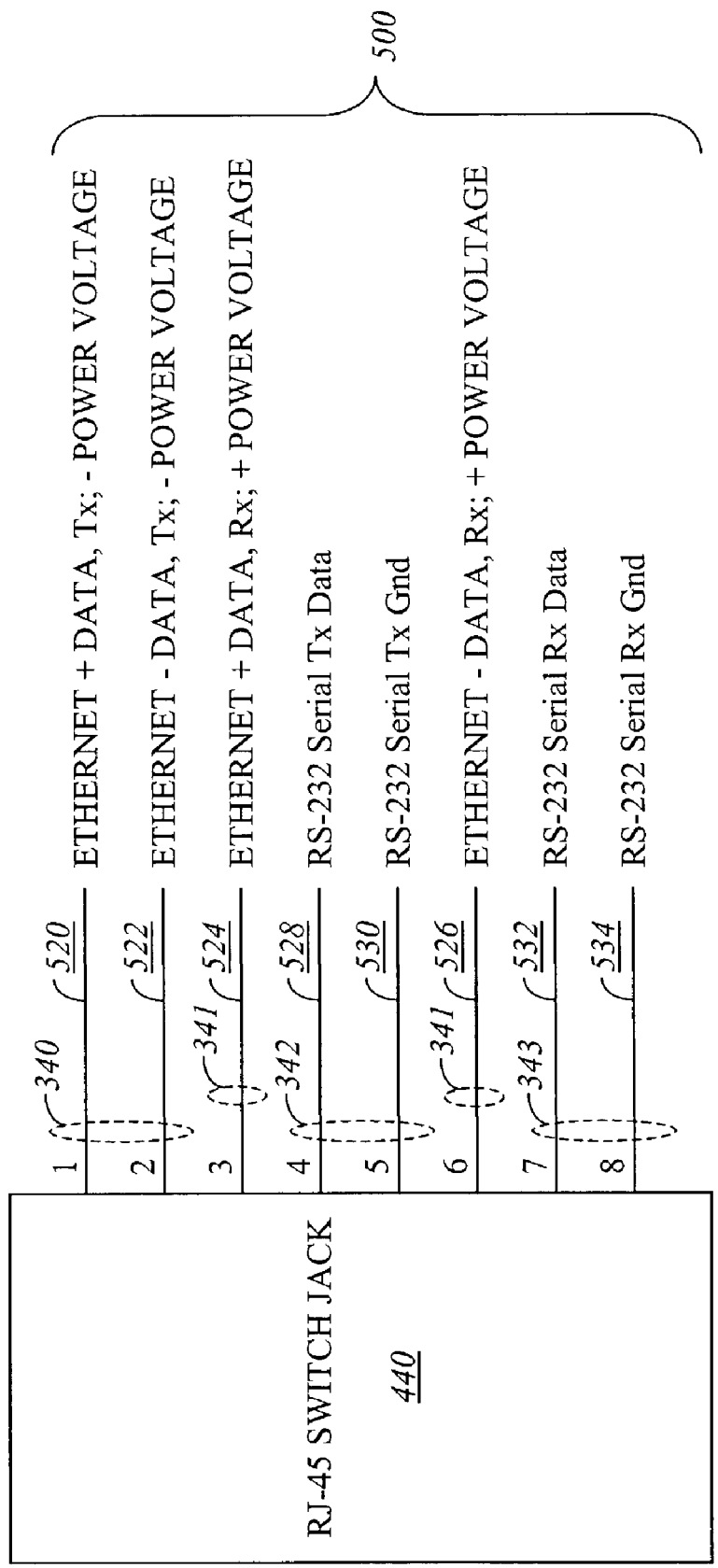
FIG. 5 is an exemplary embodiment of a pinout configuration of a switch jack of the Ethernet switch of FIG. 4.

Referring to FIG. 5, an exemplary embodiment of a pinout configuration of switch jack 440 of the multifunctional switch of FIG. 4 is shown. For this embodiment of the invention, output 500 of switch jack 440 provides Ethernet data, power, and serial RS-232 control over 4 twisted pairs 340-343 of interconnect 330 (e.g., CAT-5 cable).

The Ethernet data follows the IEEE 802.3u 100Base-TX and IEEE 802.3 10Base-T specifications. However, it is contemplated that other Ethernet specifications such as 1000Base-TX or signaling protocols could be used to support data transfers.

For this illustrative embodiment, Ethernet data is output from pins (1,2) 520 and 522 in the transmit (TX) direction and received by pins (3,6) 524 and 526 in the receive (RX) direction. The power is provided on same pairs in accordance with the IEEE 802.3af Specification. In particular, negative power is supplied via pin 520 and 522 while positive power is supplied via pins 524 and 526.

The serial RS-232 data is provided on two twisted pairs with TX data on pins (4,5) 528 and 530 and RX data on pins (7,8) 532 and 534. For RS-232 transmissions, for each twisted pair, one wire of the twisted pair is grounded.

With respect to the coupling between switch 300 and one or more APs $210_1$-$210_N$, each line driver component of the switch is coupled to a unique, corresponding RJ-45 switch jack. This allows serial control data to be transmitted from pins 4,5 of switch jack 440 to AP $210_1$ over one twisted pair and data to be received from AP $210_1$ over pins 7,8 of switch jack 440. In addition, Ethernet data and power for AP $210_1$ is provided via pins 1,2 and 3,6 of the RJ-45 switch jack 440.

Figure 6:
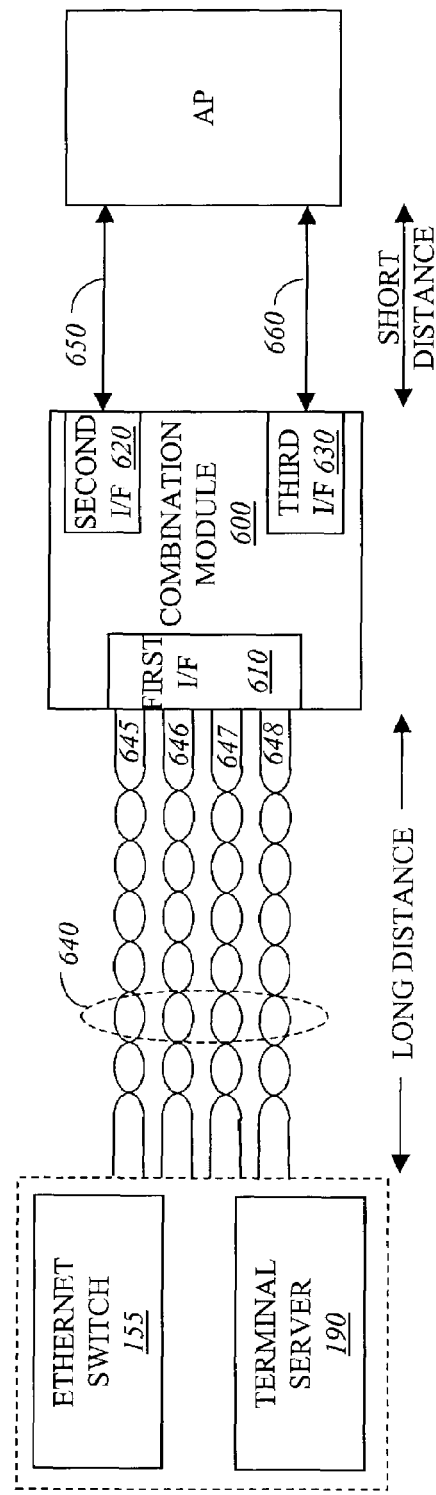
FIG. 6 is a second exemplary embodiment of a single interconnect connectivity of an Access Point of FIG. 2.

Referring to FIG. 6, a second exemplary embodiment of single interconnect connectivity of an Access Point of FIG. 2 is shown. For this embodiment, a combination module 600 is deployed within a pre-existing network to enable one-cable connectivity for an existing AP.

As shown, combination module 600 comprises a plurality of communication interfaces, namely a first interface 610, a second interface 620 and a third interface 630. Herein, for this embodiment, first interface 610 is adapted to receive and/or transmit Ethernet data, power and serial control information over a first interconnect 640. Second and third interconnects 650 and 660 are coupled to second interface 610 and third interface 620, respectively. Interconnects 650 and 660 separately route Ethernet data/power and out-of-band control signals, such as serial (RS-232) control information for example, to an AP.

As shown, interconnect 640 is a CAT-5 twisted pair cable, which features four twisted pairs 645-648. One twisted pair 645 is used to transmit data from Ethernet switch 155 while another pair 646 is used by Ethernet switch 155 to receive data. These pairs 645 and 646 also provide power to the AP in accordance with IEEE 802.3af. The remaining twisted pairs 647 and 648 are adapted to transmit and receive serial control information in accordance with RS-232, RS-422A, RS-485 or any other serial communication protocol. The length of interconnect 640 is substantially longer than a length of any of the other interconnects 650 and 660. For instance, the length of interconnect 640 may be at least ten times greater than the length of interconnect 650 or 660 (length of interconnect being over fifty meters while the length of interconnects 650 or 660 may be less than three meters). Also, interconnects 650 and 660 may be implemented using CAT-5 cabling as well.

Figure 7:
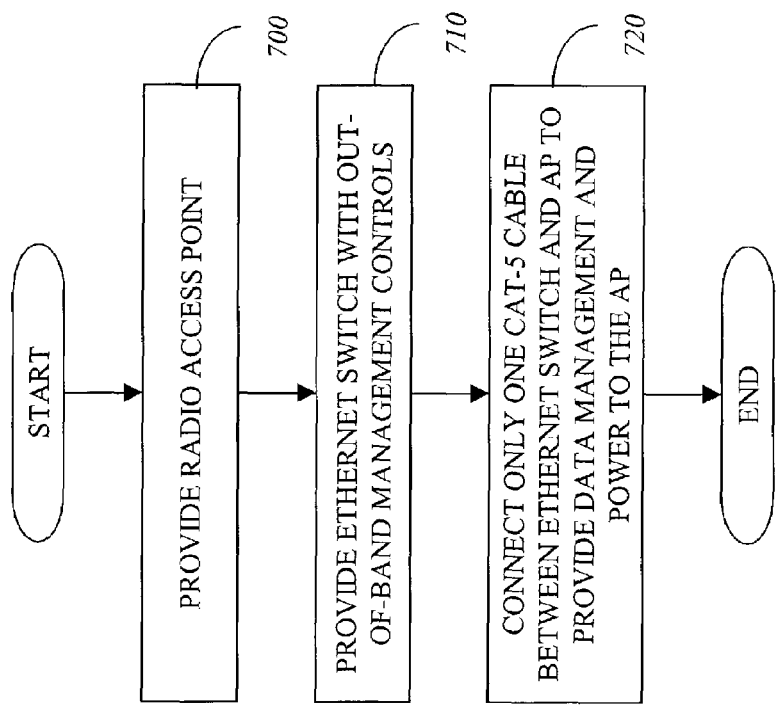
FIG. 7 is an exemplary embodiment of a flowchart identifying the operations for providing connectivity of the Access Point using a single interconnect.

Referring now to FIG. 7, an exemplary embodiment of a flowchart identifying the operations for providing connectivity of the Access Point using a single interconnect is shown. First, a Radio Access Point (AP) is provided (block 700). Next, a multifunctional Ethernet switch is provided (block 710). The multifunctional Ethernet switch includes components for management of out-of-band control functionality such as UART/line driver components for each switch jack deployed. Thereafter, the Ethernet switch is coupled to one or more APs via cable having four or more twisted pairs (block 720). This allows data along with management control data and/or power to be supported by a single cable. The number of APs correspond to the number of switch jacks deployed and utilized in the Ethernet switch.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A system comprising:
an access point; and
a single interconnect coupled to the access point to transfer data, control signals and power, the interconnect includes at least four twisted pairs of which (i) a first twisted pair carries both data and a negative power voltage, (ii) a second twisted pair carries both data and a positive power voltage, and (iii) at least one twisted pair of the at least four twisted pairs to transfer the control signals in accordance with a serial communication protocol that differs from a communication protocol associated with the first twisted pair, the at least one twisted pair being used for troubleshooting functional problems with the access point by a switch with determinative routing functionality and supporting the serial communication protocol having a higher latency than the communication protocol associated with the first twisted pair, the serial communication protocol being one of a plurality of serial communication protocols including a Recommended Standard 232 (RS-232) communication protocol, a Recommended Standard 422 (RS-422) communication protocol and a Recommended Standard 485 (RS-485) communication protocol.

2. The system of claim 1, wherein the at least one twisted pair transferring the control signals is adapted in accordance with the Recommended Standard 232 (RS-232) communication protocol.

3. The system of claim 1, wherein the interconnect is a Category 5 (CAT-5) cable and the at least one twisted pair transferring the control signals in accordance with the Recommended Standard 485 (RS-485) communication protocol.

4. The system of claim 2, the switch being coupled to an opposite end of the interconnect from the access point, the switch comprises a control unit, a universal asynchronous receive transmit (UART) component coupled to the control unit, and a line driver coupled to the UART component.

5. The system of claim 4, wherein the switch further comprises a Registered Jack 45 (RJ-45) jack coupled to the line driver to receive the control signals.

6. The system of claim 5, wherein the switch further comprises a data switching unit coupled to both the control unit and the RJ-45 jack, both the control unit and the data switching unit to place data being received by the switch into a frame for routing to a port of the RJ-45 jack.

7. The system of claim 4, wherein the at least one twisted pair carrying the control signals includes a third twisted pair to carry serial control information being transmitted to the access point and a fourth twisted pair to carry serial control information being received by the switch.

8. A wireless local area network comprising:
an access point;
a combination module coupled to the access point through a second interconnect and a third interconnect, the second interconnect to exchange data between the combination module and the access point and the third interconnect to exchange serial control information between the combination module and the access point, the serial control information being configured in accordance with one of a Recommended Standard 232 (RS-232) serial format, a Recommended Standard 422 (RS-422) serial format and a Recommended Standard 485 (RS-485) serial format; and
a first interconnect coupled to the combination module and differing from the second interconnect and the third interconnect, the first interconnect to transfer the data and power over at least a first and second twisted pairs and the serial control information over at least a third and fourth twisted pairs to the combination module with the transfer of the serial control information being in accordance with a RS-232 communication protocol having a higher latency than communication protocol used for transfer of the data and power over the first and second twisted pairs, the first interconnect being substantially longer in length than either the second interconnect or the third interconnect.

9. The wireless local area network of claim 8, wherein the first interconnect includes at least four twisted pairs of which the first twisted pair carries data being transmitted to the access point and a negative power voltage associated with the power, the second twisted pair carries data being received from the access point and a positive power voltage associated with the power.

10. The wireless local area network of claim 9, wherein the first interconnect further comprises the third twisted pair to carry serial control information being transmitted to the access point and the fourth twisted pair to carry serial control information from the access point.

11. The wireless local area network of claim 8, wherein the first interconnect is a Category 5 (CAT-5) cable.

12. The wireless local area network of claim 11, further comprising:
a switch coupled to one end of the CAT-5 cable at which the access point is coupled to the other end of the CAT-5 cable, the switch comprises a universal asynchronous receive transmit (UART) component and a line driver coupled to the UART component to enable the serial control information to be carried over the CAT-5 cable.

13. The wireless local area network of claim 12, wherein the switch further comprises a Registered Jack 45 (RJ-45) jack coupled to the line driver.

14. The wireless local area network of claim 8, wherein the length of the first interconnect being at least ten times longer than a length of second interconnect.

15. A method comprising:
providing an access point and a switch having a plurality of ports from which data, power and serial control information is selectively routed; and
coupling a single interconnect between the access point and the switch, the single interconnect to transfer the data, power and serial control information from the switch to the access point, the serial control information being configured in accordance with one of a Recommended Standard 232 (RS-232) serial format, a Recommended Standard 422 (RS-422) serial format and a Recommended Standard 485 (RS-485) serial format having a latency higher than a latency of a communication protocol supporting the transfer of data and power, the coupling of the single interconnect comprises (1) coupling the switch to a first end of a cable including at least four twisted pairs, (2) coupling the access point to a second end of the cable, and (3) supplying (i) data in accordance with an Ethernet frame format over a first twisted pair and a second twisted pair, (ii) power over the first twisted pair and the second twisted pair, and (iii) serial control information over a third twisted pair and a fourth twisted pair, the serial control information being used for controlling an initial configuration of the access point and for troubleshooting functional problems with the access point.

16. The method of claim 15, wherein the supplying of the data includes transmission of the data as Ethernet frames over the first twisted pair, receipt of the data as Ethernet frames over the second twisted pair, and transmission of the serial control information over at least the third twisted pair where the serial control information is configured in accordance with the RS-232 serial format.

17. The method of claim 15, wherein the supplying of the power comprises supplying a negative voltage over the first twisted pair and a positive voltage over the second twisted pair.

* * * * *

UNITED STATES PATENT AND TRADEMARK OFFICE
CERTIFICATE OF CORRECTION

PATENT NO. : 7,627,002 B1　　　　　　　　　　　　　　　　　　　　Page 1 of 1
APPLICATION NO. : 10/237755
DATED : December 1, 2009
INVENTOR(S) : Andrade et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Second Day of November, 2010

David J. Kappos
*Director of the United States Patent and Trademark Office*